(12) United States Patent
Brita et al.

(10) Patent No.: US 8,497,328 B2
(45) Date of Patent: Jul. 30, 2013

(54) CATALYST COMPONENTS FOR THE POLYMERIZATION OF OLEFINS AND CATALYSTS THEREFROM OBTAINED

(75) Inventors: Diego Brita, Ferrara (IT); Gianni Collina, Cassana Ferrara (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 230 days.

(21) Appl. No.: 12/737,742

(22) PCT Filed: Aug. 13, 2009

(86) PCT No.: PCT/EP2009/060470
§ 371 (c)(1),
(2), (4) Date: Mar. 10, 2011

(87) PCT Pub. No.: WO2010/020575
PCT Pub. Date: Feb. 25, 2010

(65) Prior Publication Data
US 2011/0152482 A1    Jun. 23, 2011

Related U.S. Application Data

(60) Provisional application No. 61/189,674, filed on Aug. 21, 2008.

(30) Foreign Application Priority Data

Aug. 20, 2008  (EP) .................................. 08162656

(51) Int. Cl.
*C08F 4/54*  (2006.01)

(52) U.S. Cl.
USPC ........ 526/124.3; 526/348; 502/118; 502/103; 502/126; 502/127

(58) Field of Classification Search
USPC .................... 526/124.3, 124.2, 348; 502/118, 502/103, 126, 127
See application file for complete search history.

(56) References Cited

U.S. PATENT DOCUMENTS

| | | | |
|---|---|---|---|
| 4,124,532 A | 11/1978 | Giannini et al. | |
| 4,282,114 A | 8/1981 | Ito et al. | |
| 4,298,718 A | 11/1981 | Mayr et al. | |
| 4,393,182 A | 7/1983 | Goodall et al. | |
| 4,399,054 A | 8/1983 | Ferraris et al. | |
| 4,469,648 A | 9/1984 | Ferraris et al. | |
| 4,495,338 A | 1/1985 | Mayr et al. | |
| 4,526,882 A | 7/1985 | Johnson et al. | |
| 4,829,034 A | 5/1989 | Liskolan et al. | |
| 5,037,909 A * | 8/1991 | Schramm et al. | 526/114 |
| 5,100,849 A | 3/1992 | Miya et al. | |
| 5,733,987 A | 3/1998 | Covezzi et al. | |

FOREIGN PATENT DOCUMENTS

| | | |
|---|---|---|
| EP | 395083 | 6/1991 |
| JP | 56086905 A | 7/1981 |
| WO | WO 92/21706 | 12/1992 |
| WO | WO 93/03078 | 2/1993 |
| WO | WO 98/44009 A1 | 10/1998 |
| WO | WO-03/002617 * | 1/2003 |
| WO | WO 03/002617 A1 | 1/2003 |
| WO | WO 2008/074674 A1 | 6/2008 |

OTHER PUBLICATIONS

Mitsubishi Petrochemical Co., LT, "XP002557037-Polymerization catalysts for Olefins", 1981.

* cited by examiner

*Primary Examiner* — Ling Choi
*Assistant Examiner* — Catherine S Branch

(57) ABSTRACT

A solid catalyst component comprising Ti, Mg, halogen and a couple of monofunctional electron donor compounds MD1 and MD2 selected from esters and ethers, said donors being present in amounts such that the molar ratio MD1/MD2 ranges from 20 to 800. The so obtained catalyst component when converted into a catalyst is able to produce ethylene polymers with good morphological properties even under drastic polymerization conditions.

9 Claims, No Drawings

CATALYST COMPONENTS FOR THE POLYMERIZATION OF OLEFINS AND CATALYSTS THEREFROM OBTAINED

This application is the U.S. national phase of International Application PCT/EP2009/060470, filed Aug. 13, 2009, claiming priority to European Application 08162656.6 filed Aug. 20, 2008 and the benefit under 35 U.S.C. 119(e) of U.S. Provisional Application No. 61/189,674, filed Aug. 21, 2008; the disclosures of International Application PCT/EP2009/060470, European Application 08162656.6 and U.S. Provisional Application No. 61/189,674, each as filed, are incorporated herein by reference.

The present invention relates to catalyst components for the polymerization of olefins $CH_2CHR$, wherein R is hydrogen or hydrocarbon radical having 1-12 carbon atoms. In particular, the invention relates to catalyst components suitable for the preparation of homopolymers and copolymers of ethylene and to the catalysts obtained therefrom.

In particular, the present invention relates to solid catalyst components, comprising titanium magnesium and halogen, and a specific combination and content of monofunctional electron donors compounds.

The molecular weight distribution (hereinafter MWD) is a particularly important characteristic for ethylene (co) polymers, in that it affects both the rheological behavior and therefore the processability of the melt, and the final mechanical properties. Polyolefins having a broad MWD, particularly coupled with relatively high average molecular weights, are preferred in blow molding and high speed extrusion processing for example for the production of pipes. In fact, polymers characterized by broad MWD have superior mechanical properties that enable their use in applications in which high stress resistance is required. The processing conditions for these polymers are peculiar and in fact under those conditions a narrow MWD product could not be processed because it would present failures due to melt fracture.

As it is difficult to have available catalysts offering the right pattern of molecular weight distribution and average molecular weight, one of the most common methods for preparing broad MWD polymers is the multi-step process based on the production of different molecular weight polymer fractions in each step, sequentially forming macromolecules with different length on the catalyst particles.

The control of the molecular weight obtained in each step can be carried out according to different methods, for example by varying the polymerization conditions or the catalyst system in each step, or by using a molecular weight regulator. Regulation with hydrogen is the preferred method either working in suspension or in gas phase. This latter kind of process is nowadays highly preferred due to both the high quality of the polymer obtained and the low operative costs involved with it.

For a catalyst to perform in such a process a critical step is that in which the low molecular weight fraction is prepared. In fact, one of important features that the catalyst should possess is the so called "hydrogen response", that is the extent of capability to reduce the molecular weight of polymer produced in respect of increasing hydrogen concentration. Higher hydrogen response means that a lower amount of hydrogen is required to produce a polymer with a certain molecular weight. In turn, a catalyst with good hydrogen response would also usually display a higher activity in ethylene polymerization due to the fact that less hydrogen, having a depressive effect on the catalyst activity, is required.

In addition, due to the polymerization conditions and characteristics of the polymer produced in this step (intrinsically higher fragility), the catalyst/polymer system is often fragmented in very small particles that reduce the polymer bulk density and create high amount of fines making difficult the operation of the plant particularly in the gas-phase polymerization.

Various attempts have been made to prepare catalysts able to withstand to such demanding polymerization conditions. In WO2008/074674 it has been described that a catalyst having good morphological stability and ability to withstand to drastic polymerization conditions could be obtained for example by subjecting an already preformed porous catalyst to thermal treatment and/or a contact stage with an aluminum alkyl compound. Although the results are good in terms of morphological stability, it has to be noted that this treatment, in addition to lowering the polymerization activity also makes the catalyst preparation process more complex. Also, the use of modifying agents has been tried.

Several documents like for example U.S. Pat. No. 5,037,909 and WO03/002617 teach to use, in catalyst preparation, a couple of donors constituted by a monofunctional donor, i.e., ethyl benzoate, together with a major amount of a difunctional donor. While an increased polymerization activity is obtained, no positive effect is seen in terms of morphological stability.

It has therefore surprisingly been found that an increased morphological stability, particularly in ethylene polymerization, can be obtained by preparing catalyst components comprising a couple of different monofunctional donors in a specific ratio.

Accordingly, it is an object of the present invention a solid catalyst component comprising Ti, Mg, halogen and a couple of monofunctional electron donor compounds MD1 and MD2 selected from esters and ethers, said donors being present in amounts such that the molar ratio MD1/MD2 ranges from 20 to 800.

Preferably, the MD1/MD2 molar ratio is from 40 to 650. The electron donor compounds MD1 and MD2 are preferably selected from aliphatic or aromatic monoethers and aromatic or aliphatic esters of aromatic or aliphatic monocarboxylic acids. In particular, C2-C20 aliphatic ethers are preferred while the cyclic ethers, particularly those having 3-5 carbon atoms, are especially preferred. Among them, tetrahydrofurane, tetrahydropirane and dioxane are the most preferred. Diethyl ether and isoamyl ether are the most preferred linear aliphatic ethers. Preferred esters are the C1-C10 alkyl esters of C1-C20, preferably C1-C10, aliphatic monocarboxylic acids and the C1-C10 alkyl esters of C7-C20 aromatic monocarboxylic acids. Particularly preferred esters are ethyl acetate, ethyl benzoate, n-butylbenzoate, isobutylbenzoate, ethyl p-toluate.

The MD1 and MD2 electron donor compounds can belong to the same or different class. Preferably, they both belong to the mono esters class. The combination ethyl acetate and ethyl benzoate is the most preferred. When they belong to different classes it is preferred that MD1 is chosen from the above mentioned esters and MD2 is chosen from the above mentioned ethers. The MD1+MD2/Ti molar ratio is preferably higher than 3, and more preferably ranges from 3.5 to 20, especially from 4 to 15.

The content of MD1 typically ranges from 10 to 60% wt with respect to the total weight of the solid catalyst component, more preferably from 15 to 55% wt. The content of MD2 typically ranges from 0.01 to 5% wt with respect to the total weight of the solid catalyst component, more preferably from 0.05 to 3% wt.

The Mg/Ti molar ratio preferably ranges from 7 to 120, more preferably from 10 to 110 and especially from 15 to 100.

In a particular embodiment of the present invention, the catalyst component comprises, in addition to the electron donor compounds MD1 and MD2, a Ti compound containing at least a Ti-halogen bond and a magnesium dihalide. Preferred titanium compounds are the tetrahalides or the compounds of formula $TiX_n(OR^1)_{4-n}$, where $0 \leq n \leq 3$, X is halogen, preferably chlorine, and $R^1$ is C1-C10 hydrocarbon group. Titanium tetrachloride is the preferred titanium compound.

The magnesium dihalide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The catalyst components of the invention can be prepared according to several methods. According to one of these methods, the magnesium dichloride in an anhydrous state and the suitable amount of MD1 and MD2 are milled together under conditions in which activation of the magnesium dichloride occurs. The so obtained product can be treated one or more times with a suitable amount of $TiCl_4$. This treatment is followed by washings with hydrocarbon solvents until chloride ions disappeared.

According to a particular embodiment, the solid catalyst component can be prepared by a first step comprising reacting a suitable amount of titanium compound of formula $Ti(OR^1)_{n-y}X_y$, where X is halogen, n is the valence of titanium and y is a number between 1 and n, preferably $TiCl_4$, with a magnesium chloride deriving from an adduct of formula $MgCl_2 \cdot pR^2OH$, where p is a number between 0.1 and 6, preferably from 2 to 4.5, and $R^2$ is a hydrocarbon radical having 1-18 carbon atoms, in the presence of a suitable amount of the MD1 and/or MD2 compound. Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the sphenilization is the spray cooling described for example in U.S. Pat. Nos. 5,100,849 and 4,829,034.

Particularly interesting are the $MgCl_2 \cdot (EtOH)_m$ adducts in which m is from 0.15 to 1.7 obtained subjecting the adducts with a higher alcohol content to a thermal dealcoholation process carried out in nitrogen flow at temperatures comprised between 50 and 150° C. until the alcohol content is reduced to the above value. A process of this type is described in EP 395083.

The dealcoholation can also be carried out chemically by contacting the adduct with compounds capable to react with the alcohol groups.

Generally these dealcoholated adducts are also characterized by a porosity (measured by mercury method) due to pores with radius due to pores with radius up to 0.1 μm ranging from 0.15 to 2.5 $cm^3/g$ preferably from 0.25 to 1.5 $cm^3/g$.

In the preferred process for the preparation of the catalyst of invention the donors MD1 and MD2 are added sequentially. Preferably, the donor MD2 is added first during the reaction among the titanium compound and the adduct of formula $MgCl_2 \cdot pR^2OH$ using it in such amounts to have Mg/MD2 molar ratios of at least 10. Preferably, the ratio is in the range 15-200, more preferably 15-150.

At the end of the step the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated hydrocarbons.

The so obtained intermediate product is then brought into contact with the MD1 compound under conditions able to fix on the solid an effective amount of donor. Although not strictly required the contact is typically carried out in a liquid medium such as a liquid hydrocarbon. The temperature at which the contact takes place can vary depending on the nature of the reagents. Generally it is comprised in the range from −10° to 150° C. and preferably from 0° to 120° C. It is plane that temperatures causing the decomposition or degradation of any specific reagents should be avoided even if they fall within the generally suitable range. Also the time of the treatment can vary in dependence of other conditions such as nature of the reagents, temperature, concentration etc. As a general indication this contact step can last from 10 minutes to 10 hours more frequently from 0.5 to 5 hours. If desired, in order to further increase the final donor content, this step can be repeated one or more times. At the end of this step the solid is recovered by separation of the suspension via the conventional methods (such as settling and removing of the liquid, filtration, and centrifugation) and can be subject to washings with solvents. Although the washings are typically carried out with inert hydrocarbon liquids, it is also possible to use more polar solvents (having for example a higher dielectric constant) such as halogenated or oxygenated hydrocarbons.

In addition to the above characteristics, the catalysts of the invention preferably show a porosity P determined with the mercury method and due to pores up to 1 μm, higher than 0.4 and more preferably higher than 0.5 usually in the range 0.5-0.8. The total porosity $P_T$ can be in the range of 0.50-1.50 $cm^3/g$, particularly in the range of from 0.60 and 1.2 $cm^3/g$.

The surface area measured by the BET method is preferably lower than 80 and in particular comprised between 10 and 70 $m^2/g$. The porosity measured by the BET method is generally comprised between 0.1 and 0.5, preferably from 0.1 to 0.4 $cm^3/g$.

In the catalyst component of the invention the average pore radius value, for porosity due to pores up to 1 μm, is higher than 800, preferably higher than 1000.

The particles of solid component have substantially spherical morphology and average diameter comprised between 5 and 150 μm, preferably from 20 to 100 μm and more preferably from 30 to 90 μm. As particles having substantially spherical morphology, those are meant wherein the ratio between the greater axis and the smaller axis is equal to or lower than 1.5 and preferably lower than 1.3.

The catalyst components of the invention whatever is the method for their preparation, form catalysts, for the polymerization of alpha-olefins $CH_2=CHR^{III}$ wherein $R^{III}$ is hydrogen or a hydrocarbon radical having 1-12 carbon atoms by reaction with Al-alkyl compounds. In particular Al-triallyl compounds, for example Al-trimethyl, Al-triethyl, Al-tri-n-butyl, Al-triisobutyl are preferred. The Al/Ti ratio is higher than 1 and is generally comprised between 5 and 800.

Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures TEAUDEAC and TIBA/DEAC are particularly preferred.

The above mentioned components (i), and (ii) can be fed separately into the reactor where, under the polymerization conditions can exploit their activity. It constitutes however a particular advantageous embodiment the pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

In addition it could be also possible to introduce the Al-alkyl compound(s) (ii) into the polymerization reactors in two or more aliquots. As an example, a first aliquot can be used to form the catalysts system in the pre-contact section together with the component (i) and then introduced into the reactor for the polymerization step (a) and a second aliquot can be added to the system in the further step (b).

The spherical components of the invention and catalysts obtained therefrom find applications in the processes for the preparation of several types of olefin polymers.

As mentioned above, the catalysts of the invention are endowed with a particularly high morphological stability under high hydrogen concentration for the preparation of low molecular ethylene (co)polymer as confirmed by improved values of bulk density and qualitative morphology evaluation. Thus, they are particularly suitable for use in cascade, or sequential polymerization processes, for the preparation of broad molecular weight ethylene polymers both in slurry and gas-phase. In general the catalyst can be used to prepare: high density ethylene polymers (HDPE, having a density higher than 0.940 g/cm$^3$), comprising ethylene homopolymers and copolymers of ethylene with alpha-olefins having 3-12 carbon atoms; linear low density polyethylene's (LLDPE, having a density lower than 0.940 g/cm$^3$) and very low density and ultra low density (VLDPE and ULDPE, having a density lower than 0.920 g/cm$^3$, to 0.880 g/cm$^3$ cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight; shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight.

However, as previously indicated they are particularly suited for the preparation of broad MWD polymers and in particular of broad MWD ethylene homopolymers and copolymers containing up to 20% by moles of higher α-olefins such as propylene, 1-butene, 1-hexene, 1-octene.

One additional advantage of the catalyst described in the present application is that it can be used as such in the polymerization process by introducing it directly into the reactor without the need of pre-polymerizing it. This allows simplification of the plant set-up and simpler catalyst preparation process.

The main polymerization process in the presence of catalysts obtained from the catalytic components of the invention can be carried out according to known techniques either in liquid or gas phase using for example the known technique of the fluidized bed or under conditions wherein the polymer is mechanically stirred. However, the preferred process is carried out in the gas phase. Whatever is the process involved, the catalyst described above in view of their good morphological particles stability can be withstand polymerization temperatures higher than the standard ones, that is higher than 80° C. and in particular in the range 85-100° C. As higher polymerization temperatures allow to simultaneously get higher yields and a more efficient heat removal due to the higher difference between polymerization temperature and the refrigerating fluid, it results that with the catalyst of the invention the productivity of the polymerization plant is greatly enhanced.

Examples of gas-phase processes wherein it is possible to use the spherical components of the invention are described in WO92/21706, U.S. Pat. No. 5,733,987 and WO93/03078. In this processes a pre-contacting step of the catalyst components, a pre-polymerization step and a gas phase polymerization step in one or more reactors in a series of fluidized or mechanically stirred bed are comprised.

As mentioned above, in order to further broaden the MWD of the product, the process of the invention can be performed in two or more reactors working under different conditions and optionally by recycling, at least partially, the polymer which is formed in the second reactor to the first reactor. Usually, the two or more reactors work with different concentrations of molecular weight regulator or at different polymerization temperatures or both. Preferably, the polymerization is carried out in two or more steps operating with different concentrations of molecular weight regulator.

The following examples are given in order to further describe and not to limit the present invention.

The properties are determined according to the following methods:

Porosity and surface area with nitrogen: are determined according to the B.E.T. method (apparatus used SORPTOMATIC 1900 by Carlo Erba).

Porosity and Surface Area with Mercury:

The measure is carried out using a "Porosimeter 2000 series" by Carlo Erba.

The porosity is determined by absorption of mercury under pressure. For this determination use is made of a calibrated dilatometer (diameter 3 mm) CD$_3$ (Carlo Erba) connected to a reservoir of mercury and to a high-vacuum pump (1·10$^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

MIE flow index: ASTM-D 1238 condition E
MIF flow index: ASTM-D 1238 condition F
MIP flow index: ASTM D 1238 condition P
Bulk density: DIN-53194

Determination of Mg, $Ti_{(tot)}$ and Al: has been carried out via inductively coupled plasma emission spectroscopy (ICP) on a "I.C.P SPECTROMETER ARL Accuris".

The sample was prepared by analytically weighting, in a "fluxy" platinum crucible", 0.1÷03 g of catalyst and 3 gr of lithium metaborate/tetraborate 1/1 mixture. The crucible is placed on a weak Bunsen flame for the burning step and then after addition of some drops of KI solution inserted in a special apparatus "Claisse Fluxy" for the complete burning. The residue is collected with a 5% v/v $HNO_3$ solution and then analyzed via ICP at the following wavelength: Magnesium, 279.08 nm; Titanium, 368.52 nm; Aluminum, 394.40 nm.

Determination of Cl: has been carried out via potentiometric tritration.

Determination of OR groups: via Gas-Chromatography analysis

Ethylene Polymerization: General Procedure.

A 4.5 liter stainless-steel autoclave equipped with a magnetic stirrer, temperature and pressure indicator, feeding line for hexane, ethylene, and hydrogen, was used and purified by fluxing pure nitrogen at 70° C. for 60 minutes. Then, a solution of 1550 cm³ of hexane containing 7.7 cm³ of 10% by wt/vol TiBAL/hexane was introduced at a temperature of 30° C. under nitrogen flow. In a separate 200 cm³ round bottom glass bottle were successively introduced, 50 cm³ of anhydrous hexane, 1 cm³ of 10% by wt/vol, TiBAL/hexane solution and 0.040÷0.070 g of the solid catalyst of table 1. They were mixed together, aged 10 minutes at room temperature and introduced under nitrogen flow into the reactor. The autoclave was closed, then the temperature was raised to 85° C., hydrogen (9 bars partial pressure) and ethylene (3.0 bars partial pressure) were added.

Under continuous stirring, the total pressure was maintained at 85° C. for 120 minutes by feeding ethylene. At the end the reactor was depressurised and the temperature was dropped to 30° C. The recovered polymer was dried at 70° C. under a nitrogen flow and analyzed. The obtained results are reported in table 2.

EXAMPLES

Preparation of the Spherical Support (Adduct $MgCl_2$/EtOH)

A magnesium chloride and alcohol adduct containing about 3 mols of alcohol was prepared following the method described in example 2 of U.S. Pat. No. 4,399,054, but working at 2000 RPM instead of 10000 RPM.

The so obtained adduct was dealcoholated up to an amount of alcohol of 25% wt via a thermal treatment, under nitrogen stream, over a temperature range of 50-150° C.

Example 1

Procedure for the Preparation of the Intermediate of the Solid Catalyst Component Into a 500 mL four-necked round flask, purged with nitrogen, 250 mL of $TiCl_4$ were introduced at 0° C. and an amount of ethyl benzoate (EB) such as to have an Mg/EB molar ratio of 16. Then, at the same temperature, 17.5 g of a spherical $MgCl_2$/EtOH adduct containing 25% wt of ethanol and prepared as described above were added under stirring. The temperature was raised to 130° C. in 1 h and maintained for 60 min. Then, the stirring was discontinued, the solid product was allowed to settle and the supernatant liquid was siphoned off.

The treatment with $TiCl_4$ was carried out a second time, raising the temperature at 110° C. for 30 minutes and omitting the use of ethyl benzoate. The obtained solid was washed six times with anhydrous hexane (5×100 mL) at 60° C. and once at 25° C.

Preparation of the Final Solid Catalyst Component (Contact of the Intermediate with ED)

In a 500 mL four-necked round flask equipped with a mechanical stirrer and purged with nitrogen, 200 mL of anhydrous hexane and 10 g of the solid intermediate component obtained as disclosed above were charged at room temperature. At the same temperature, under stirring an amount of ethyl acetate corresponding to a molar ratio Mg/Acetate of 1.5 was added dropwise. The temperature was raised to 50° C. and the mixture was stirred for 3 hours. Then, the stirring was discontinued, the solid product was allowed to settle and the supernatant liquid was siphoned off.

The solid was washed 3 times with anhydrous hexane (3×100 mL) at 25° C., recovered, dried under vacuum and analyzed. The result of the analysis and of the polymerization runs are reported in table 1

Example 2

The procedure of Example 1 was repeated with the difference that in the first step was used a lower amount of EB such as to have a molar ratio Mg/EB of 40. The results of the analysis and of the polymerization runs are reported in table 1.

Example 3

The procedure of Example 1 was repeated with the difference that in the first step was used a lower amount of EB such as to have a molar ratio Mg/EB of 100. The results of the analysis and of the polymerization runs are reported in table 1.

Comparison Example 1

The procedure of Example 1 was repeated with the difference that in the first step EB was not used. The results of the analysis and of the polymerization runs are reported in table 1.

TABLE 1

| Example | Mg wt. % | Ti wt. % | MD1 wt. % | MD2 wt. % | MD1/MD2 m.r. | Yield Kg/g | MIE | BD | Morph. Evaluation |
|---|---|---|---|---|---|---|---|---|---|
| 1 | 15.2 | 1.9 | 30.2 | 1.00 | 53 | 1.1 | 48.4 | 0.342 | Broken/spheres |
| 2 | 15.1 | 2.2 | 28.0 | 0.90 | 53 | 1.1 | 87 | 0.356 | Spheres |
| 3 | 14.9 | 2.9 | 28.3 | 0.09 | 531 | 3.2 | 130 | 0.406 | Spheres |
| Comp. 1 | 15.0 | 4 | 28.0 | — | | 3.7 | 51 | 0.199 | broken |

The invention claimed is:

1. Catalyst components for the polymerization of olefins $CH_2=CHR$, wherein R is hydrogen or hydrocarbon radical having 1-12 carbon atoms comprising Ti, Mg, halogen and monofunctional electron donor compounds MD1 and MD2 selected from esters and ethers, said donors being present in an amount such that the molar ratio MD1/MD2 ranges from 20 to 800, and MD1 is present in an amount from 10 to 60% wt and MD2 is present in an amount from 0.01 to 5% wt with respect to the total weight of the catalyst component.

2. The catalyst component according to claim 1 wherein the MD1/MD2 ratio is from 40 to 650.

3. The catalyst components according to claim 1 wherein the donors MD1 and MD2 are selected from aliphatic or aromatic monoethers and aromatic or aliphatic esters of aromatic or aliphatic monocarboxylic acids.

4. The catalyst components according to claim 3 wherein the esters are the C1-C10 alkyl esters of C1-C20 aliphatic carboxylic acids and the C1-C10 alkyl esters of C7-C20 aromatic monocarboxylic acids.

5. The catalyst component according to claim 1 wherein both MD1 and MD2 belong to the mono esters class.

6. The catalyst component according to claim 1 wherein the MD1+MD2/Ti molar ratio is higher than 3.

7. The catalyst component of claim 5 wherein MD1 is ethyl acetate and MD2 is ethyl benzoate.

8. Catalysts for the polymerization of olefins comprising the product of the reaction between:
    (a) a solid catalyst component according to claim 1; and
    (b) at least one Al-alkyl compound.

9. A process comprising (co)polymerizing olefins $CH_2=CHR$, wherein R is hydrogen or hydrocarbon radical having 1-12 carbon atoms, carried out in the presence of the catalyst according to claim 8.

* * * * *